United States Patent [19]

Nishijima

[11] Patent Number: 4,805,052

[45] Date of Patent: Feb. 14, 1989

[54] APPARATUS FOR POSITIONING A MAGNETIC DISC PACK WITHIN A RECORDING/REPRODUCING DEVICE

[75] Inventor: Yasunori Nishijima, Tokyo, Japan

[73] Assignee: Fuji Photo Film Co. Ltd., Kanagawa, Japan

[21] Appl. No.: 34,956

[22] Filed: Apr. 6, 1987

[30] Foreign Application Priority Data

Apr. 4, 1986 [JP] Japan .................................. 61-77729

[51] Int. Cl.⁴ ...................... G11B 17/32; G11B 5/012; G11B 5/016
[52] U.S. Cl. ............................ 360/97.01; 360/130.34; 360/99.06
[58] Field of Search ....................... 360/97, 99, 130.34

[56] References Cited

U.S. PATENT DOCUMENTS 4,466,032 8/1984 Saito .............................. 360/130.34
4,710,831 12/1987 Nishimura ...................... 360/130.34

Primary Examiner—Robert S. Tupper
Attorney, Agent, or Firm—Sughrue, Mion, Zinn, Macpeak & Seas

[57] ABSTRACT

A device for loading and unloading a magnetic disc pack containing a magnetic disc therein into and from a magnetic recording/reproducing apparatus used in an electronic camera in which a regulation plate having a recessed portion is positioned at a position opposed to a magnetic head with the magnetic disc therebetween so as to magnetically record into and reproduce from the magnetic disc. In the loading/unloading device, a regulation plate positioning pin, which is generally erected on the main body of the device to position the regulation plate, is erected on the device main body at a position to correspond to a hole in the magnetic disc pack guided to a magnetically recording/reproducing position and the positioning pin can be brought into engagement with the positioning portion of the regulation plate or a regulation plate holder.

6 Claims, 7 Drawing Sheets

APPARATUS FOR POSITIONING A MAGNETIC DISC PACK WITHIN A RECORDING/REPRODUCING DEVICE

BACKGROUND OF THE INVENTION

1. Field of the Invention

The present invention relates to a device for loading/unloading a magnetic disc pack and, in particular, to a device for loading/unloading a magnetic disc pack used in a magnetic recording and reproducing device for an electronic camera or the like and including therein a magnetic disc in which still image information or the like can be magnetically recorded.

2. Description of the Prior Art

Recently, there has been developed an electronic still camera system in which an image pick-up device such as a solid image pick-up element, an image pick-up tube or the like is combined with a recording device using as a recording medium an inexpensive magnetic disc of a relatively larger memory capacity to be able to take a still picture or image of an object electronically and record the still image in the magnetic disc while it is rotating, while the recorded still image information can be reproduced by means of a television system, a printer or the like which is separately provided.

In such electronic still camera system, the magnetic disc is generally used in the form of a magnetic disc pack. The magnetic disc, in which the still image information or the like can be magnetically recorded, is rotatably stored in the magnetic disc pack. The magnetic disc pack is loaded in a magnetic recording device provided within an electronic camera or a reproducing device constructed integrally with or separately from the magnetic recording device.

When the magnetic disc pack is loaded into the magnetic recording device or the magnetic reproducing device, it is troublesome and inconvenient to mount a central hole formed in a center core disposed centrally of the magnetic disc within the magnetic disc pack directly onto a rotary drive shaft provided on the side of the magnetic recording or reproducing device and, therefore, there is a possibility that the magnetic disc pack may not be loaded into the magnetic recording or reproducing device accurately.

In order to avoid such trouble, conventionally, there has been proposed a device for loading/unloading a magnetic disc pack which comprises a holder supported by the main body of the magnetic recording or reproducing device in such a manner that it can be freely opened or closed. In the conventional magnetic disc pack loading/unloading device, the magnetic disc pack can be inserted into the holder and thereafter the holder can be closed so that the magnetic disc of the magnetic disc pack within the holder can be mounted onto the rotary drive shaft of the main body of the magnetic recording or reproducing device. There is provided a center core in the central portion of the magnetic disc and the rotary drive shaft is fitted into the central hole of the center core to be able to rotate the magnetic disc within the magnetic disc pack.

However, in the above-mentioned conventional magnetic disc pack loading/unloading device, the magnetic disc pack within the holder must be positioned accurately at a predetermined position in the main body of the magnetic recording or reproducing device. For this reason, there is erected a positioning pin on the side of the main body of the magnetic recording or reproducing device. That is, when the image information is recorded or reproduced, the positioning pin is fitted into a positioning hole formed in the above-mentioned magnetic disc pack to thereby position the magnetic disc pack at the predetermined position.

Also, since the magnetic disc used in such electronic camera is different from an ordinary floppy disc, that is, the magnetic disc is adapted for high-density recording and high-sped rotation, it contacts the head differently from the ordinary floppy disc which is pressed against the magnetic head by a pad. In other words, in the electronic camera or the like, there is provided a regulation plate having a recessed portion which is disposed on the opposite side of the magnetic head with the magnetic disc between them. That is, the regulation plate can be located at a given position with respect to the magnetic head to thereby cause the magnetic disc to lie along the magnetic head. The use of the regulation plate can reduce torque or turning moment over the ordinary floppy disc which is pressed against the magnetic head by use of the pad.

In other words, this means that the above-mentioned regulation plate must be located at the predetermined position accurately. The regulation plate is positioned at the predetermined position by inserting the positioning pin of the main body of the magnetic recording or reproducing device into the positioning hole formed in the regulation plate or in a regulation plate holder.

Conventionally, the positioning pin for the magnetic disc pack is provided separately from the positioning pin for the regulation plate. Also, in order to avoid interference with the magnetic disc pack, the positioning pin for the regulation plate is located outside of the space in which the magnetic disc pack is set, which prevents the main body of the magnetic recording or reproducing device from being reduced in size.

SUMMARY OF THE INVENTION

The present invention aims at eliminating the drawbacks found in the above-mentioned prior art device.

Accordingly, it is an object of the invention to provide a magnetic disc pack loading/unloading device in which a pin for positioning a regulation plate is located within the space in which a magnetic disc pack is set so as to be able to reduce the size of the whole magnetic disc loading/unloading device.

In order to attain the above object, according to the invention, there is provided a device for loading/unloading a magnetic disc pack into/from a magnetic recording/reproducing apparatus which is adapted to magnetically record or reproduce information into or from a magnetic disc rotatably stored in the magnetic disc pack, the loading/unloading device comprising: a device main body including a magnetic head, a head carriage, a drive source and the like; a holder for guiding a center core of the magnetic disc to a position at which the center core is engageable with a rotary drive shaft of the above-mentioned drive source; a regulation plate provided in a regulation plate holder and located at a position opposed to the magnetic head with the magnetic disc between them when the information is magnetically recorded or reproduced; and, a regulation plate positioning pin erected in the device main body at a position corresponding to a hole in the magnetic disc pack guided by the holder to the postion where magnetic recording or reproduction is performed, and engageable with the positioning portion of the regulation plate or the regulation plate holder via the above-mentioned hole to position the regulation plate at a predetermined position.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof wherein.

DETAILED DESCRIPTION OF THE INVENTION

Detailed description will hereunder be given of the preferred embodiment of a device for loading/unloading a magnetic disc pack according to the present invention with reference to the accompanying drawings.

Figure 5:
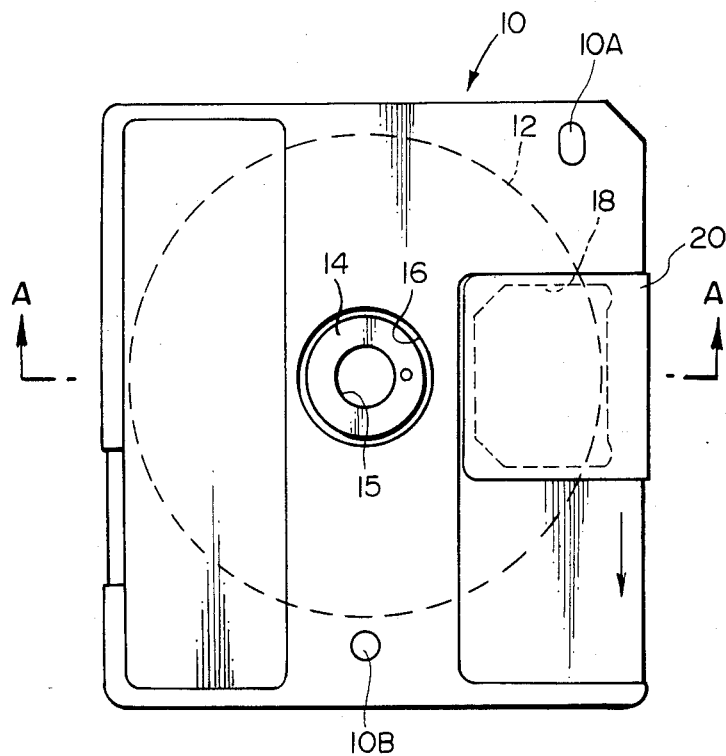
FIG. 5 is a plan view of the magnetic disc pack used in the illustrated embodiment of the invention.
Figure 6:
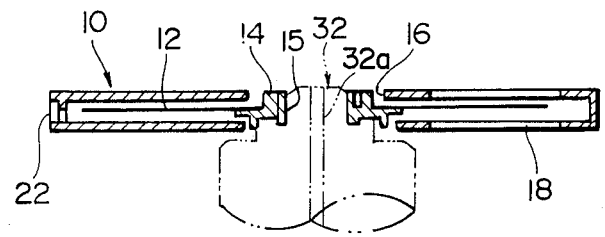
FIG. 6 is a section view taken along the line A—A in FIG. 5.

In FIG. 5, there is shown a plan view of a magnetic disc pack which is used in a magnetic recording or reproducing device of an electronic camera or the like. In FIG. 6, there is shown a section view of the same magnetic disc pack taken along the line A—A in FIG. 5. As shown in FIG. 5, the magnetic disc pack, which is designated by 10, is formed in a substantially square shape and, within the magnetic disc pack 10, there is stored a magnetic disc 12 in a rotatable manner in which still image information or the like can be recorded. The magnetic disc 12 is provided in the central portion thereof with a center core 14 as a reinforcing member and the center core 14 is exposed externally from a circular opening 16 formed in the magnetic disc pack 10. The center core 14 is formed with a central hole 15 and the center hole 15 is provided with a resilient piece (not shown). A drive shaft 32 to be described later can be inserted into the central hole 15 of the center core 14 against the energizing or biasing force of the resilient piece. The magnetic disc pack 10 is formed with a window portion 18 in which a magnetic head to be described later is positioned, and the window portion 18 can be opened or closed by a slidable shutter 20. Specifically, before the magnetic disc pack 10 is inserted into a holder to be described later, the shutter 20 closes the window portion 18 to prevent dust from attaching to the magnetic disc 12; and, after insertion of the magnetic disc pack 10 into the holder, the magnetic disc pack 10 is engaged with a claw provided in the holder and the shutter 20 is moved in a downward direction in FIG. 5 to open the window portion, which enables the image information to be recorded into or reproduced from the magnetic disc 12. The magnetic disc pack 10 is formed on the side end thereof opposed to the shutter 20 with a recess 22 for engagement, which recess 22 can be used to secure the magnetic disc pack 10 provisionally when it is inserted into the holder. In the drawings, reference characters 10A, 10B respectively designate holes for positioning the magnetic disc pack 10.

Figure 1:
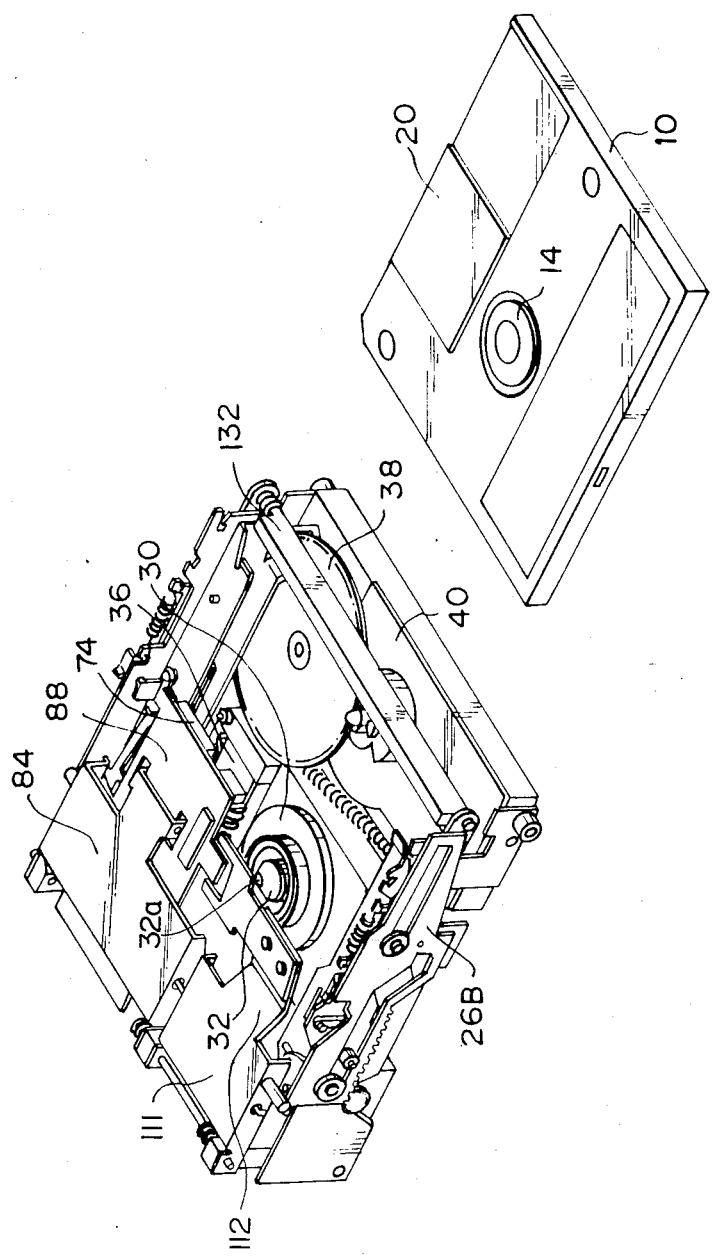
FIG. 1 is an assembled, perspective view to show the whole structure of a magnetic disc pack loading/unloading device according to the present invention.
Figure 2:
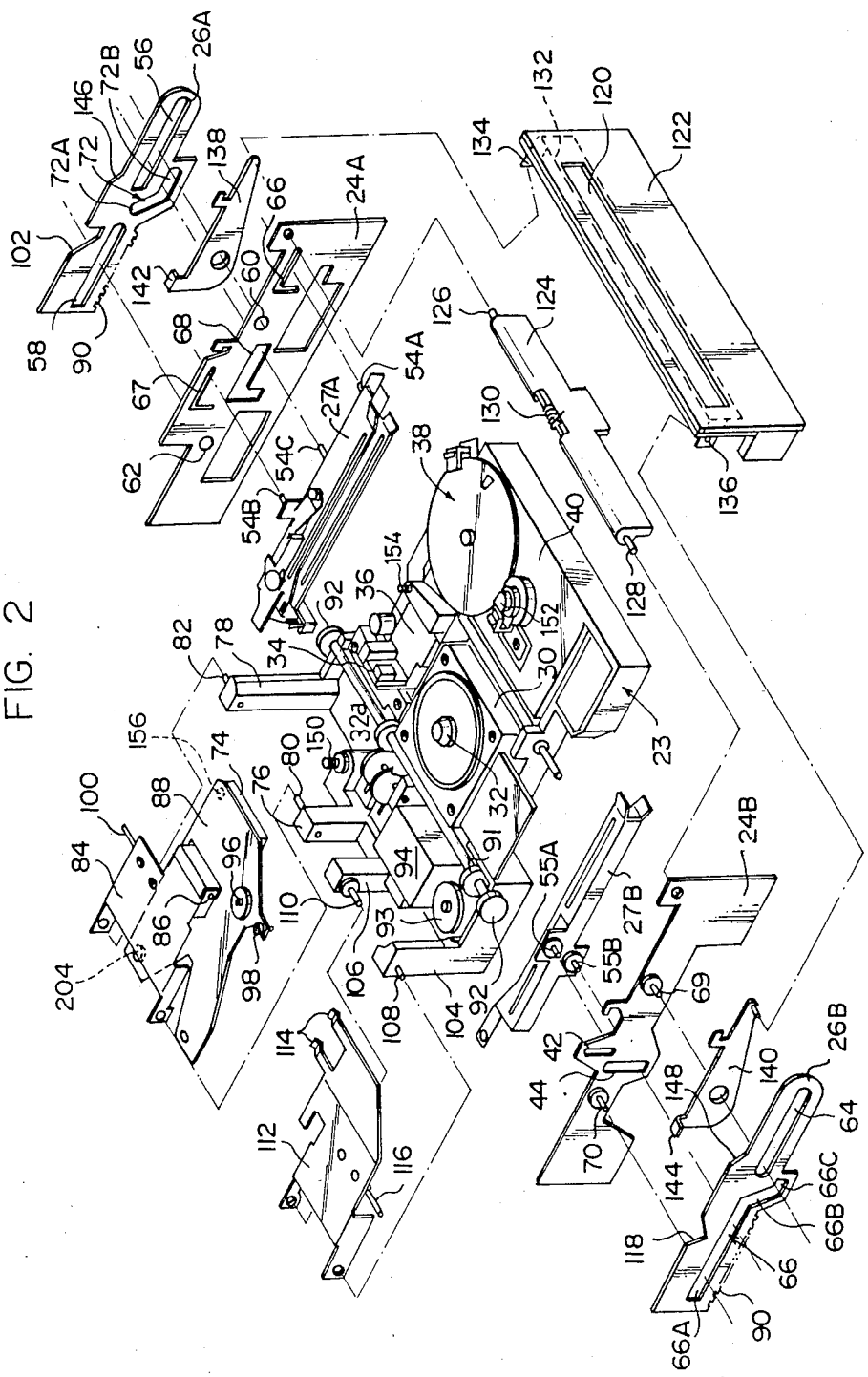
FIG. 2 is an exploded, perspective view to show the whole structure of the above-mentioned disc pack loading/unloading device according to the invention.

Now, in FIG. 1, there is illustrated a perspective view of a magnetic disc pack loading/unloading device according to the present invention after it is assembled, while, in FIG. 2, there is illustrated a perspective view of the same loading/unloading device when it is exploded. The present magnetic disc pack loading/unloading device is mainly composed of a main body 23, support plates 24A, 24B, sliders 26A, 26B, two holder half sections 27A, 27B, a regulation plate holder 88, and a push cover 112. Referring first to the internal structure of the main body 23, the main body 23 is provided with a motor 30 for driving the magnetic disc 12 and the drive shaft 32 of the motor 30 can be inserted into the central hole 15 in the center core 14 of the magnetic disc pack 10 shown in FIG. 5 to rotate the magnetic disc 12 at a given number of rotations within the magnetic disc pack 10. The device main body 23 also includes therein a magnetic head 34, a head carriage 36 to which the magnetic head 34 is mounted, and a feed motor 40 which is used to move the head carriage 36 via a gear reduction device 38. Therefore, a given number of rotations of the feed motor 40 defining a track pitch, in accordance with which the head carriage 36 is moved to move the magnetic head 34 radially along the magnetic disc 12, to record still image information on or reproduce the information from the magnetic disc 12 on each track.

Figure 9:
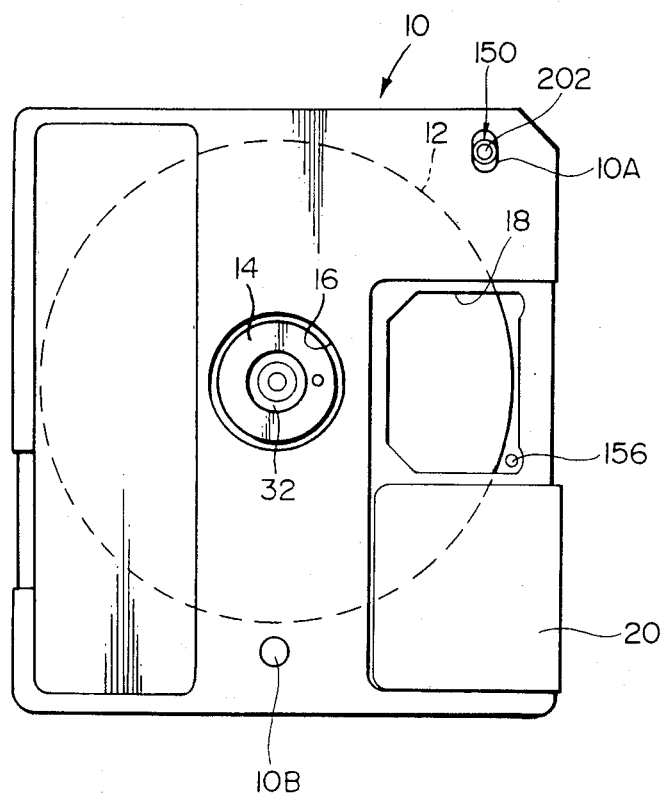

Further, on the device main body 23, there are erected positioning pins 150, 152. The positioning pin 150 can be inserted into the hole 10A of the magnetic disc pack 10 and the pin 152 can be inserted into the hole 10B of the magnetic disc pack 10 to position the magnetic disc pack 10 at a predetermined position. The pin 150, as described later, can be inserted into a receive member 204 of the regulation plate holder 88 to position a regulation plate 74. The other pin 154 for positioning the regulation plate holder 88 is erected on the main body 23 and it can be inserted into a receive member 156 provided adjacent the regulation plate 74 to position the regulation plate 74. The positioning pin 154, as shown in FIG. 9, is arranged such that it projects from the window portion 18 of the magnetic disc pack 10 into the receive member 156.

A pair of support plates 24A, 24B are mounted on either side of the device main body 23. One support plate 24A is formed with substantially L-shaped regulation grooves 66, 67, 68 which are respectively used to regulate the insertion direction of the magnetic disc pack guided by guide pins 54A, 54B, 54C in the holder half section 27A as well as the movement of the magnetic disc pack in a direction intersecting with the insertion direction. Specifically, the regulation groove 66 regulates the guide pin 54A of the holder half section 27A when the pin 54A is inserted into the groove 66; the regulation groove 67 regulates the guide pin 54B when the latter is inserted into the former; and, the regulation groove 68 regulates the guide pin 54C when the pin 54C is inserted therein. Also, the other support plate 24B is formed with vertical grooves 42, 44 into which pins 55A, 55B provided in the other holder half section 27B can be inserted, respectively.

A pair of sliders 26A, 26B are mounted to the support plates 24A, 24B fixed to the main body 23 such that the sliders 24A, 24B can be slided freely in the insertion direction of the magnetic disc pack 10. That is, one of the sliders 26A is formed with transverse grooves 56, 58 and pins 60, 62 projecting outwardly of the support plate 24A are fitted into the transverse grooves 56, 58, respectively, so that the slider 26A is freely slidable in the magnetic disc pack insertion direction with respect to the support plate 24A. Also, the other slider 26B is formed with a transverse groove 64 and a cam groove 66. A pin 69 projecting outwardly of the support plate 24B is fitted into the transverse groove 64 and a pin 70 is fitted into the cam groove 66. As a result of this, the slider 26B is free to slide in the magnetic disc pack insertion direction with respect to the support plate 24B. The sliders 26A, 26B are provided in the parts of the lower edges thereof with racks 90, respectively, and the racks 90 are engaged with gears 92, respectively. The gears 92 are connected to a drive motor 94 via a gear 91 provided coaxially therewith and a gear reduction device 93.

The slider 26A is formed with a cam groove 72 for guiding the guide pin 54C of the holder half section 27A. The cam groove 72 is used to regulate the rising and falling movements of the holder half section 27A. As shown in FIG. 2, the cam groove 72 is composed of a tapered portion 72A and a flat portion 72B continuing from the tapered portion 72A. On the other hand, the pin 55B of the other holder half section 27B is fitted into and guided by the cam groove 66 in the other slider 26B, and thus the rise and fall of the holder half section 27B are controlled by the cam groove 66. The cam groove 66 comprises an upper flat portion 66A, a tapered portion 66B, and a lower flat portion 66C.

The holder 27 comprises a pair of holder half sections 27A, 27B and the two holder half sections 27A, 27B are respectively folded into a substantially U-shaped section so as to be able to store the magnetic disc pack 10 therein. Between the two holder half sections 27A, 27B there is formed an opening through which the drive shaft 32, magnetic head 34 and the like provided in the device main body 23 can be inserted. The holder half section 27A performs the draw-in operation (horizontal movement) as well as the rise-and-fall operation of the magnetic disc pack 10 by means of the regulation grooves 66, 67, 68 of the support plate 24A and the cam groove 72 of the slider 26A. The other holder half section 27B does not carry out the draw-in operation of the magnetic disc pack 10, but carries out only the rise-and-fall operation of the pack 10 by means of the vertical grooves 42, 44 of the support plate 24B and the cam groove 66 of the slider 26B correspondingly to the rise-and-fall operation of the pack 10 by the holder half section 27A.

Next, description will be given of the mounting structure of the regulation plate 74.

The device main body 23 is provided with two support members 76, 78 erected at the inner end thereof and a regulation plate holder mounting plate 84 is rotatably supported by the two support members 76, 78 via pins 80, 82 respectively provided in and projected laterally from the support members 76, 78. Also, a regulation plate holder 88 is pivotally supported at the front end of the regulation plate holder mounting plate 84 via a pin 86. The regulation plate 74 is mounted to the back surface of the regulation plate holder 88 and a P.G sensor 96 is mounted to the side of the regulation plate 74. The regulation plate 74 causes the magnetic disc 12 to lie along the magnetic head 34 when the magnetic head 34 carries out the magnetic recording or reproducing operation with respect to the magnetic disc 12. Further, adjacent the P.G sensor 96, there is provided a screw 98 for adjusting the height of the regulation plate 74. The lower end of the screw 98 is brought into contact with the upper end of the center portion 32a of the drive shaft 32 for adjustment of the height of the regulation plate 74, and this center portion 32a of the drive shaft 32 is prevented from rotating.

The regulation plate holder mounting plate 84 is provided with a pin 100 extending outwardly. This pin 100 is guided by a cam 102 provided along the upper edge of the slider 26A so as to be able to raise or lower the regulation plate holder 88 as well as the regulation plate 74 at a given timing.

Next, description will be given of a mechanism to push the center core. The device main body 23 is also provided with support members 104, 106 in parallel with the above-mentioned support members 76, 78 at the inner end thereof. A push cover 112 is rotatably supported by these two support members 104, 106 via pins 108, 110 respectively projecting laterally therefrom. The push cover 112 is provided in the end thereof with a pair of folded, V-shaped projections 114, 114 which are used to push the center core 14 of the magnetic disc 12 toward the drive shaft 32. The push cover 112 is also provided with an outwardly extending pin 116 which can be guided by a cam 118 formed along the upper edge of the slider 26B so as to raise or lower the projections 114, 114 at a given timing.

Next, the shutter mechanism of the magnetic disc pack insertion opening will be described. A front panel 122 formed with an insertion opening 120 is mounted to the front side of the device main body 23. Inside of the front panel 122 there is provided a first shutter 124 which is located so as to face the insertion opening 120. At the two ends of the first shutter 124 there are provided pins 126, 128 respectively and the first shutter 124 can be supported rotatably by the support plates 24A, 24B by means of these two pins 126, 128. Further, the first shutter 124 is energized in a direction to close the insertion opening 120 by means of a spring 130.

On the back side of the front panel 122 there is provided a second shutter 132 such that it is free to move in a vertical direction. The second shutter 132 is also adapted to open or close the insertion opening 120 of the front panel 122. The second shutter 132 is pivotally supported at the ends thereof by a pair of levers 138, 140 via holes 134, 136. The two levers 138, 140 are swingably mounted via the pins 60, 69 of the support plates 24A, 24B to the support plate 24A, 24B, respectively. The levers 138, 140 are respectively provided with follower pieces 142, 144 folded outwardly and the follower pieces 142, 144 can be guided or moved up and down by cams 146, 148 formed along the upper edges of the sliders 26A, 26B so as to raise and lower the second shutter 132 at a given timing.

Figure 3:
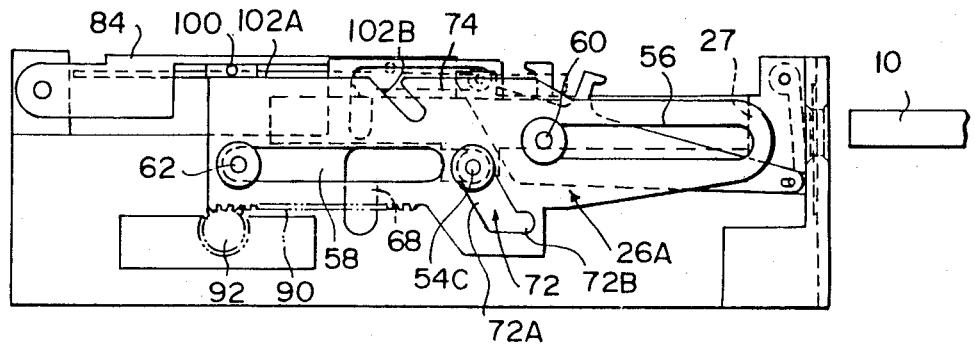
FIGS. 3(A), (B) and (C) are respectively side views to show where the magnetic disc pack in the illustrated embodimen of the invention is inserted and removed.
Figure 3:
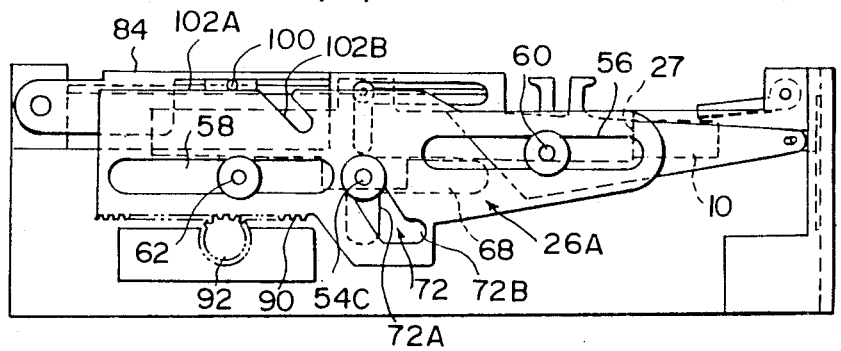
Figure 3:
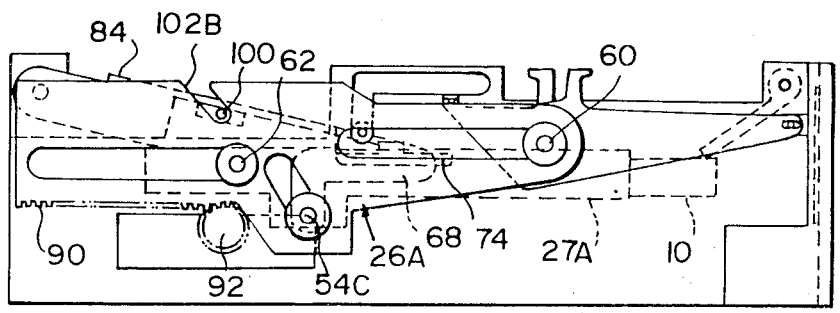

The magnetic disc pack loading/unloading device constructed in the above-mentioned manner can be operated as follows: At first, if the magnetic disc pack 10 is inserted into the holder 27 in a state as shown in FIG. 3(A), then, as described above, the magnetic disc pack 10 is secured provisionally within the holder 27 and, at that time, the shutter 20 of the magnetic disc pack 10 is released to open the window portion 18 of the magnetic disc pack 10. At that time, although the guide pin 54C of the holder half section 27A is situated at the upper end of the tapered portion 72A of the cam groove 72 shown in FIG. 2, it actually is located in the horizontal portion of the regulation groove 68. Therefore, the holder half section 27A is able to perform only the draw-in operation (horizontal operation) of the magnetic disc pack 10. In this state, the holder half section 27A exist at a position off from the drive shaft 32. On the other hand, because the pins 55A, 55B are fitted into and restricted by the vertical grooves 42, 44 respectively, the other holder half section 27B is prevented from moving in the draw-in direction (horizontal direction) and remains at that position, that is, it is only waiting.

Also, the guide pin 100 of the regulation plate holder mounting plate 84 is situated in the flat portion 102A of the cam 102 of the slider 26A, that is, it remains stationary there. From this state, when the sliders 26A, 26B are moved in the insertion direction of the magnetic disc pack in FIG. 2, then the guide pins 54A, 54B, 54C of the holder half section 27A are located in the horizontal portions of the regulation grooves 66, 67, 68 of the support plate 24A respectively, so that the holder half section 27A can be moved in the draw-in direction (that is, it can be moved horizontally). This can be seen in FIG. 3(B). After then, when the guide pins 54A, 54B, 54C enter the vertical portions of the regulation grooves 66, 67, 68, then the horizontal movement of the holder half section 27A is restricted and the guide pin 54C is guided and lowered by the tapered portion 72A of the cam 72. Following this, the holder half section 27A is lowered toward the drive shaft 32 and at the same time the other holder half section 27B is also lowered down, so that the center core 14 of the magnetic disc pack 10 can be mounted onto the drive shaft 32. This state is shown in FIG. 3(C).

On the other hand, during the movements of the above-mentioned guide pins 54A, 54B, 54C, 55A, 55B, as shown in FIGS. 3(A), (B), the guide pin 100 of the regulation plate holder mounting plate 84 is initially moved along the flat portion 102A of the cam 102 of the slider 26A, but the regulation plate holder mounting plate 84 as well as the regulation holder 88 remain unchanged in position. When the guide pin 100 of the regulation plate holder mounting plate 84 is positioned in the tapered portion 102B of the cam 102, then as shown in FIG. 3(C), the regulation plate holder 88 is guided and moved downwardly by the tapered portion 102B and the regulation plate 74 is caused to lie within the window portion 18 of the magnetic disc pack 10, that is, the plate 74 is situated at a position opposed to the magnetic head. In this condition, the magnetic head is positioned in the window portion 18 and thus the magnetic head is able to magnetically record the still image information into the magnetic disc 12 of the magnetic disc pack or reproduce it therefrom.

Figure 4:
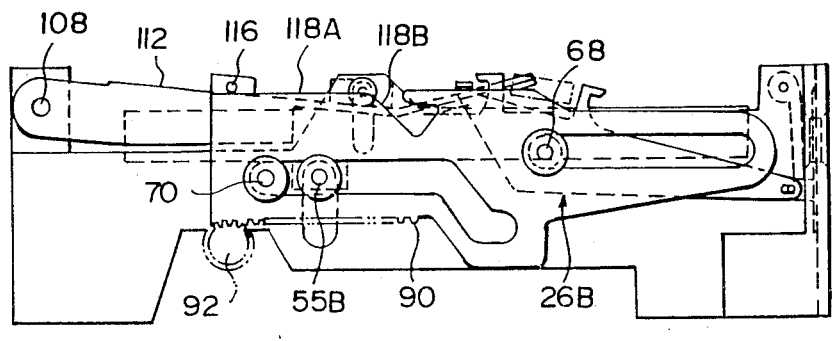
FIGS. 4(A) and (B) are respectively side views to show how a center core is pushed.
Figure 4:
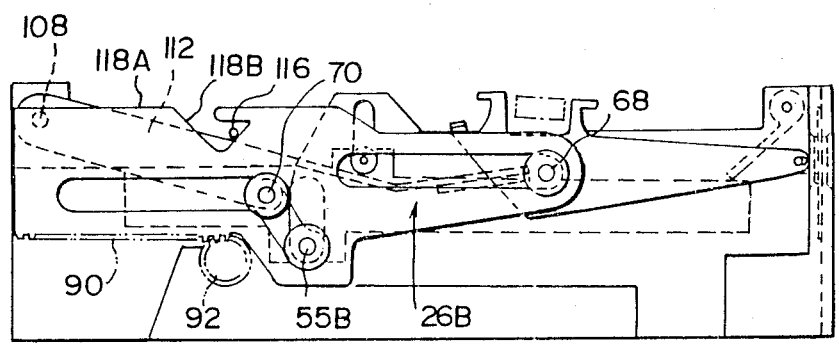

Next, the operation of the push cover 112 will be explained mainly in connection with FIGS. 4(A), (B). The guide pin 116 of the push cover 112 is initially situated in the flat portion 118A of the cam 118 of the slider 26B and, as shown in FIG. 4(A), it remains there until the two holder half sections 27A, 27B have moved the magnetic disc pack 10 to the mounting position thereof. If the two sliders 26A, 26B are moved and the center core 14 of the magnetic disc 12 is inserted into the drive shaft 32, then the guide pin 116 of the push cover 112 is fitted into the V-shaped groove 118B of the cam 118, thereby causing the push cover 112 to rotate about the pins 108, 110 and move toward the center core 14. When the guide pin 116 reaches the deepest part of the V-shaped groove 118B, the center core 14 is pushed by the projections 114, 114, so that the center core 14 can be mounted to the drive shaft 32 securely. After such center core push operation, as shown in FIG. 4(B), the guide pin 116 begins to ascend the V-shaped groove 118B to thereby cause the two projections 114, 114 to part from the center core 14, so that the image information can now be recorded or reproduced.

In order to take out the magnetic disc pack 10, the above-mentioned operation may be reversed. In other words, if the slider 26 is moved in the reverse direction, at first, the guide pin 116 of the push cover 112 is moved from the position shown in FIG. 4(B) to the deepest part of the V-shaped groove 118B, where the guide pin 116 carries out the above-mentioned center core push operation to thereby stop the rotation of the magnetic disc 12. After then, as the slider 26 is moved, the guide pin 116 of the push cover 112 ascends the V-shaped groove 118B so that the push cover 112 is caused to part from the center core 14.

Next, the guide pin 100 of the regulation plate holder mounting plate 84 is pushed up by the tapered portion 102B of the cam 102 to rise upwardly, with the result that the regulation plate 74 goes out of the window portion 18 of the magnetic disc pack 10 and retreats upwardly. While the regulation plate holder 88 and the regulation plate 74 are retreating upwardly, the guide pins 54A, 54B, 54C, 55A, 55B of the holder have not reached the tapered portions 72A, 66B of the cams 72, 66 yet. And, the guide pins 54A, 54B, 54C are prevented against movement because they are fitted into the vertical portions of the regulation grooves 66, 67, 68, respectively, while the pins 55A, 55B are also prevented against movement becasue they are fitted into the vertical grooves 42, 44, respectively. For this reason, there is no possibility that the holder may be moved to collide against the regulation plate holder 88. When the rising movement of the regulation plate holder 88 is ended, then the guide pins 54A, 54B, 54C, 55A, 55B of the holder arrive at the tapered portions 72A, 66B of the sliders 26A, 26B and, due to the upward pushing forces of the tapered portions 72A, 66B, the guide pins 54A, 54B, 54C, 55A, 55B are moved in the reverse direction that is, in an upward direction, with the result that the two holder half sections 27A, 27B are also caused to move upwardly. After then, the guide pins 54A, 54B, 54C are moved horizontally in the right direction and the holder half section 27A returns to the insertion/take-out position of the magnetic disc pack 10 shown in FIG. 3(A).

The foregoing are the loading and unloading operations of the magnetic disc pack loading/unloading device according to the present invention. Next, we will describe how the regulation plate or the regulation plate holder is positioned.

The regulation plate 74 or the regulation plate holder 88 can be positioned (in height) by means of the height adjust screw 98, and positioning pins 150, 154.

Figure 7:
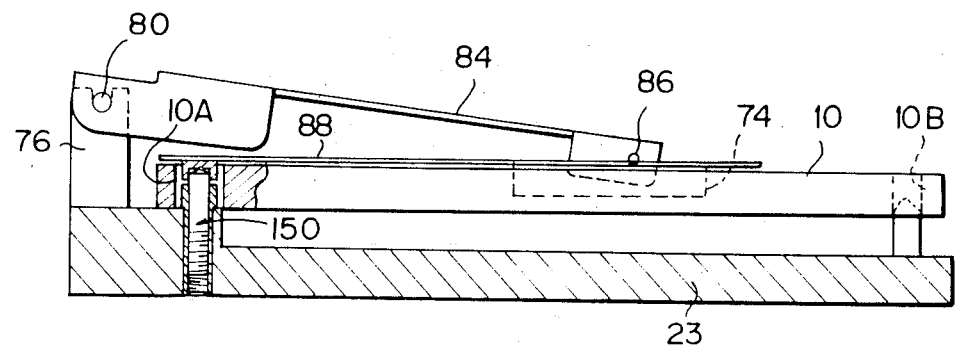
FIG. 7 is a section view to show the position of a positioning pin employed in the illustrated embodiment of the invention.
Figure 8:
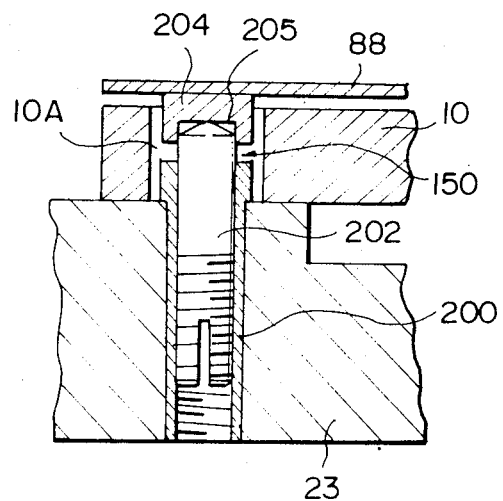
FIG. 8 is an enlarged section view of the positioning pin employed in the illustrated embodiment of the invention, and, FIG. 9 is a plan view of the magnetic disc pack when it is set on a drive shaft.

Now, FIG. 7 is a section view of the device main body to show the position of the positioning pin 150, and FIG. 8 is a section view to show the structure of the positioning pin 150.

The positioning pin 150 is composed of an outer tube 200 and a pin 202 threaded with the inside of the outer tube. The outer tube 200 is fixed to the device main body and can be inserted into the positioning hole 10A of the magnetic disc pack 10 to position the magnetic disc pack 10 at a predetermined position. Also, the pin 202 can be fitted into a recessed portion 205 in a receive member 204 mounted to the back surface of the regulation plate holder so as to position the regulation plate holder 88.

On the other hand, the height adjust screw 98, as described before, can be brought into contact with the upper end of the center portion 32a of the drive shaft 32 to adjust the height of the regulation plate 74. And, the positioning pin 154 can be projected from the window portion 18 of the magnetic disc pack 10 to position the regulation plate 74.

Conventionally, in order to avoid the interference with the magnetic disc pack 10, the positioning pins to position the regulation plate holder 88 are located outside of the magnetic disc pack 10, which provides an obstacle to reduction of the size of the whole loading-/unloading device, as pointed out before. However, according to the illustrated embodiment of the invention, since the regulation plate holder 88 can be positioned by the positioning pins 150, 154 that are located in the space within the magnetic disc pack 10, except for the height adjust screw 98, there is eliminated the need to provide such positioning pins outside the magnetic disc pack 10, which allows the whole magnetic disc pack loading/unloading device to be reduced in size over the conventional device.

It should be understood, however, that there is no intention to limit the invention to the specific forms disclosed, but on the contary, the invention is to cover all modifications, alternate constructions and equivalents falling within the spirit and scope of the invention as expressed in the appended claims.

What is claimed is:

1. A magnetic disc pack loading/unloading device for use in a magnetic recording/reproducing apparatus in which information can be recorded into and/or reproduced from a magnetic disc rotatably stored within a magnetic disc pack, said disc pack including a window through which a magnetic head is inserted during a recording/reproducing operation, and a hole located in a different part of said magnetic disc pack from said window, said magnetic disc pack loading/unloading device comprising:

a device main body provided with said magnetic head, a head carriage, and a drive source, said drive source including a rotary shaft;

a holder for guiding the center core of said magnetic disc to a position where it can be engaged with said rotary drive shaft;

a regulation plate holder including a regulation plate, said regulation plate being disposed at a position opposed to said magnetic head with said magnetic disc between them during the magnetic recording or reproducing operation of said apparatus; and, a first regulation plate positioning pin erected on said device main body so as to correspond to the position of said hole formed in said magnetic disc pack when said magnetic disc pack is guided by said holder to a position where said magnetic recording or reproducing operation can be performed, said regulation plate holder having a recess into which said first pin fits when said magnetic disc pack is inserted in said loading/unloading device, said first pin passing through said hold and fitting into said recess to position said regulation plate at a given position.

2. A magnetic disc pack loading/unloading device as set forth in claim 1, further including a magnetic disc pack positioning pin, wherein said first regulation plate positioning pin is located coaxially with and inside of said magnetic disc pack positioning pin, said recess having a smaller inner periphery than said hole, said magnetic disc pack positioning pin fitting through said hole andd said first regulation plate positioning pin fitting into said recess.

3. A magnetic disc pack loading/unloading device as set forth in claim 1, further comprising a second regulation plate positioning pin on said device main body, said regulation plate holder having a second opposed recess, said second pin and said second recess being aligned with said window when said magnetic disc pack is inserted in said loading/unloading device such that said second pin passes through said window and fits in said second recess.

4. A magnetic disc pack loading/unloading device as set forth in claim 1, wherein said regulation plate holder includes a height adjust screw which contacts a top portion of said rotary drive shaft of said magnetic disc when said magnetic disc pack is in position for said recording/reproducing operation to adjust the height of said regulation plate.

5. A magnetic disc pack loading/unloading device as set forth in claim 1, further including a magnetic disc pack positioning pin, wherein said first regulation plate positioning pin is formed integrally with said magnetic disc pack positioning pin.

6. A magnetic disc pack loading/unloading device as set forth in claim 5, wherein said first regulation plate positioning pin is coaxial with and threaded inside said magnetic disc pack positioning pin.

* * * * *